United States Patent
Goodwin et al.

(10) Patent No.: US 6,701,089 B1
(45) Date of Patent: Mar. 2, 2004

(54) OVER-EQUALIZATION FOR MULTI-SPAN WAVELENGTH DIVISION MULTIPLEXED FIBER OPTIC COMMUNICATION SYSTEMS

(75) Inventors: John C. Goodwin, Nepean (CA); Keith Y. K. Lee, Etobicoke (CA)

(73) Assignee: Nortel Networks Limited, St. Laurent (CA)

(*) Notice: Subject to any disclaimer, the term of this patent is extended or adjusted under 35 U.S.C. 154(b) by 479 days.

(21) Appl. No.: 09/609,282

(22) Filed: Jun. 30, 2000

(51) Int. Cl.[7] ............................................... H04J 14/02
(52) U.S. Cl. ......................... 398/79; 398/34; 398/38; 398/92; 385/140
(58) Field of Search .......................... 359/124, 110, 359/134, 161; 385/140; 398/34, 38, 79, 92, 157

(56) References Cited

U.S. PATENT DOCUMENTS

| | | | |
|---|---|---|---|
| 5,225,922 A | * 7/1993 | Chraplyvy et al. | 359/124 |
| 5,276,543 A | * 1/1994 | Olshansky | 359/124 |
| 5,513,029 A | 4/1996 | Roberts | 359/177 |
| 5,969,840 A | 10/1999 | Roberts | 359/161 |
| 6,040,933 A | * 3/2000 | Khaleghi et al. | 359/124 |
| 6,219,162 B1 | * 4/2001 | Barnard et al. | 359/124 |
| 6,363,202 B1 | * 3/2002 | Goodfellow | 385/140 |
| 6,487,336 B1 | * 11/2002 | Yao | 385/24 |

* cited by examiner

Primary Examiner—Kinfe-Michael Negash

(57) ABSTRACT

In an amplified wavelength division multiplexes (WDM) fiber optic communication system, each channel experiences a different optical gain, dispersion and noise. Also, the evolution of WDM fiber optic systems to higher density channel spacing has further aggravated multi-channel nonlinear distortions such as four-wave mixing (FWM) and cross-phase modulation (XPM). The standard method for controlling these nonlinearities is the peak power control method. The performance of the channels can be equalized by adjusting the transmission powers of the optical transmitters. However, just equalization of a performance indication factor (PIF) such as BER or Q is not the optimum approach when peak power control mode of operation dominates. This invention is directed towards improving the margins of performance of WDM fiber optic channels. The transmission powers of the channels are adjusted methodically until the received performance margins of the channels are substantially equal then the power levels of the channels under peak power control mode are increased to just touch the provisional power level.

31 Claims, 5 Drawing Sheets

OVER-EQUALIZATION FOR MULTI-SPAN WAVELENGTH DIVISION MULTIPLEXED FIBER OPTIC COMMUNICATION SYSTEMS

FIELD OF THE INVENTION

This invention relates to multi-span Wavelength Division Multiplexed (WDM) fiber optic communication systems and more specifically to a WDM system using Erbium Doped Fiber Amplifier (EDFA) optical amplifiers.

BACKGROUND OF THE INVENTION

Wavelength Division Multiplexed (WDM) optical fiber telecommunication systems can have extremely high overall data capacity since each channel is capable of carrying a high data rate signal. These high capacity signals can be carried cost-effectively over many hundreds of kilometers if Erbium Doped Fiber Amplifiers (EDFA) are used to boost the power of the optical signal periodically. Thee is a growing requirement to increase the capacity of the existing communication systems.

FIG. 1 illustrates a typical unidirectional fiber optic communication system. A transmitter terminal 111 includes a number (n) of transmitters 102,105,108 each of which transmits one channel at a certain power that is adjusted by their respective variable optical attenuators (VOA) 103,106, 109. A multiplexer 110 is used to wavelength division multiplex a plurality (n) of channels 101,104,107. A plurality (m) of optical fiber spans 114,116,119 and in-line EDFAs 113,115,118,120 couple the transmitter terminal 111 at a first location to a receiver terminal 121 at a second location which is remote from the first location. The input to the receiver terminal is coupled to a dispersion compensation module (DCM) 122. A demultiplexer 123 is connected to the output of DCM 122 and outputs from the demultiplexer 123 are coupled to n receivers 124,125,126. There is also an operations, administration and maintenance (OAM) system 112 which is connected to the transmitter terminal 111 directly and to all other network elements indirectly via an optical service channel (OSC) 117. The OAM 112 is comprised of a processing element, memory such as random access memory (RAM), flash memory and a permanent or removable storage device such as a hard disk drive, a floppy disk drive, or a compact disc drive (CD). The optical service channel 117 is shown separate from the optical fiber for schematic purposes only. In reality, it is carried by the optical fiber. This setup is a well understood unidirectional optical fiber communication system.

One major problem in such an implementation as disclosed in FIG. 1 is the non-uniform wavelength dependent gain profile of the EDFAs 113,115,118,120, and further within any other optical device that may be included between the multiplexer 110 and the demultiplexer 123. These problems, inherent to the currently utilized EDFA optical fiber amplifiers result in each channel within a particular WDM system having a different optical gain and a different resulting Optical Signal to Noise Ratio (OSNR). Hence, some channels could have a relatively low OSNR and low received power which, in turn, could lead to an excessively high Bit Error Rate (BER).

A significant challenge in carrying such multi-channel signals over many spans of fiber separated by boosting EDFAs has to do with the fact that the wavelength spectrum of the gain of the EDFAs is not flat. In fact, as shown in FIG. 2, because of the physical properties of the Erbium ions that provide the gain, the shape of the gain spectrum 201 changes from strong gain (about 23.5 dB at 1530 nm) to weak gain (about 21.5 dB at 1560 nm). In a long multi-span cascade of fiber spans and EDFA line-amplifiers, the nominal gain of the EDFA is set equal to the span loss, so that a nominal channel does not rise or fall in power as it propagates downstream. This non-ideal gain spectrum means that in a long multi-span cascade of fiber spans and EDFA line-amplifiers, some channels will have more gain than the average and will grow in relative power as the multi-channel signal propagates down the link. However, some channels have less gain than average, and so the power of that channel will decrease as the multi-channel signal propagates down the link.

The amount of gain provided by an EDFA is controlled by the amount of pump laser power that is applied to the Erbium doped fiber, and typically covers a range of 15 dB to 35 dB. The amount of output power capability of the EDFA is also influenced by the amount of pump laser power. For any given amount of pump power, there is a certain limit to the total power over all of the channels, with 15 dBm as an example of a typical value. This is a natural physical limit at which the pump photon flux is just sufficient to replenish the depletion of the Erbium population inversion by the high signal output power. As well as this natural physical limit on the total power capability, there can also be an additional lower limit applied by design. For a given number of channels, it might be useful to limit the total power out of the EDFA and launched into the optical fiber in order to avoid certain nonlinearities in the fiber. This total power control (TPC) mode typically is implemented by tapping off a very small but controlled fraction of the light at the output of the EDFA and monitoring that with a photodetector.

Since all of the wavelength channels can carry revenue generating traffic, it is of interest to ensure that all of the channels meet a certain standard of performance. In a digital system, Bit Error Rate (BER) is typically used as a figure of merit, and $10^{-12}$ is a common objective for BER. One of the main influences which will degrade the BER of multi-span EDFA links is the noise provoked by the Amplified Spontaneous Emission (ASE) which is generated inside the EDFAs. The amount of ASE relative to the signal power is typically quantified by the Optical Signal to Noise Ratio (OSNR), defined as:

$$\text{OSNR} = \text{Signal Power}/(\text{ASE density} * BW_{OSNR})$$

where $BW_{OSNR}$ is the spectral band over which the OSNR is defined (for example 0.1 nanometers)

To optimize the OSNR of any given channel in a multi-span link; the input powers to each EDFA should be kept as high as possible at all of the amplifiers. This influences the design of multi-channel links where some channels will be increasing in power going down span, and some channels will be decreasing in power. The simplest case to consider is one in which all of the channels are initially launched at the same power. In the case of a channel which has more than average EDFA gain, it increases in power after that initial launch point, up until the receiver. With such high powers going into the EDFAs, that channel will have a good OSNR and will then have a good BER, provided that fiber nonlinearities are not provoked. However, a channel which has less than average gain will drop in power at every span as it propagates down-link. This channel will have a poor OSNR and thereby will have a high BER, which may not meet an objective link $10^{-12}$.

FIG. 2 shows one way to deal with this channel gain disparity 201 is to use a so-called gain-flattening filter inside the EDFA so that the spectrum of the net gain (Erbium plus filter) is flat 203 at a particular gain value, called the Design Flat Gain (DFG). FIG. 2 shows the gain spectra at 3 different gains. Trace 201 is with gain above DFG, 22 dB. Trace 202 is with gain below DFG, 18 dB. Trace 203, is with gain exactly at DFG, 20 dB. It is recognized that this shape-cancelling process is not perfect and so there is generally a residual ripple at the DFG. Although the EDFA can be design-flat at a single gain value, the losses of the fiber spans can cover a wide range. A simple way to deal with this is to set the DFG at a large value by design, and then ask the end user to add carefully selected attenuation to each of their individual fiber spans to bring the total loss (span plus attenuator) up to the DFG. Although this can work, the extra loss added to every span will degrade the performance of the system.

A more sophisticated way to get around this problem resulting from gain differences between channels, but without adding loss, is to use an equalization technique. Equalization is documented in U.S. patent application Ser. No. 08/997,822 entitled "Methods for Equalizing WDM Systems" filed on Dec. 24, 1997 by Chris Wilhelm Barnard and Chung Yu Wu, assigned to Nortel Networks Corporation. This application is incorporated by reference herein. Equalization refers to a balancing of a performance indication factor (PIF) or alternatively a PIF margin defined as the amount by which the received power can decrease before the performance of the channel signal becomes unacceptable as dictated by a pre-determined performance threshold at the receiver end. Possible options for PIFs are the OSNR or ideally the BER itself. BER is the preferred option since it also deals with any channel-channel differences in distortion, and is the ultimate performance measure that is relevant to the end user. Equivalent to BER is the so-called Q parameter, where a BER of $10^{-12}$ corresponds to a Q of 7. Equalizing by BER or by Q is equivalent.

With equalization, the launched power of each channel's transmitter (Tx) 102,105,108 is adjusted individually, either manually or under control of software running on the OAM 112. One method of setting the Tx-end launched power is to adjust a Variable Optical Attenuator (VOA) 103,106,109 after the Tx, as shown in FIG. 1. Channels which have above average gain will have their Tx-end launched power set to a low value, and then their power will increase from there over successive spans, to hold a certain level on average. Similarly, channels which are below average gain will have their launched power set higher than average, and then the power will drop from there over successive spans, to average out at the same level as that of the strong channels. The objective here is to ensure that the OSNR at the receiver is the same over all channels and so there is a better chance that the BERs would be the same. Specifically, for the weak channels with below average gain that were at a great disadvantage without equalization, this procedure will boost their power as averaged over all the spans.

At first, it might be thought that the simplest way to ensure that the weak channels do not severely hamper the system would simply be to turn all transmitters up to their highest launched power achievable. However, constraints (either natural or by design) on the total power available from the EDFA rule out this simple approach. Given that the total EDFA power is limited, the solution in the past has traditionally been to turn up all transmitters only by the appropriate amount such that the end performance (either OSNR or BER) is balanced between all channels. If any transmitters were launching more than the power necessary to achieve this balanced performance condition, then they would necessarily be taking more power than they need from at least one of the EDFAs. Because of the constraint on total EDFA power, this removal of power would then reduce the power available to the weaker channels. This means that the performance of the weaker channels would suffer if the strong channels were allowed to get better end performance than the average. In conclusion, when operating under total power constraints, adjusting the channel launched power of the transmitters to achieve equalization of the end performance of all of the channels is the optimum solution.

The evolution of WDM fiber systems to higher channel count has called for both an increased wavelength range of operation for the EDFAs as well as narrower channel spacing. When the wavelength channels get closer together, there is a class of multi-channel nonlinear distortions in the fiber which get more important. Four-Wave Mixing (FWM) and Cross-Phase Modulation (XPM) are multi-channel nonlinearities that get stronger with closer channel spacing. To avoid problems resulting from these nonlinearities, it has been typically found that an additional degree of control of the EDFAs is needed, beyond just control over the total power. A good control scheme to avoid these nonlinearities is then by peak power control (PPC). Here, the EDFA gain is allowed to increase until the peak value over all of the channel powers at that EDFA just touches the provisioned level. Peak power control is documented in U.S. Pat. No. 5,969,840 "Optical Element Power Control" by Roberts, assigned to Nortel Networks and is incorporated by reference herein.

To implement a peak power control scheme at an EDFA, it is necessary to know the powers of each individual channel at each EDFA output. This can be done in a straightforward way by installing some type of optical spectrum analyzer inside each EDFA. However, a lower cost approach to peak power control is to use monitoring signals which are unique to each channel. This approach is documented in U.S. Pat. No. 5,513,029 "Method and Apparatus for Monitoring Performance of Optical Transmission Systems" by Roberts assigned to Nortel Networks and which is incorporated by reference herein. Under control of the OAM 112, an optical signal is modulated with a low frequency dither signal to provide a modulated optical signal having a known modulation depth. Measurement apparatus at the output of each EDFA 113,115,118,120 taps a portion of the optical signal and both a total power and a dither amplitude of the tapped portion of the optical signal are measured. The signal amplitude of the tapped portion of the optical signal is estimated by comparing the measured dither amplitude to the measured total signal power. In wavelength division multiplexed optical transmission systems, optical signals at each distinct wavelength are modulated with distinct dither signals and dither amplitudes of each distinct dither signal detectable in the tapped portion of the optical signal are measured. The signal amplitude is estimated for the optical signals at each distinct wavelength. The relative signal powers of optical signals at distinct wavelengths are controlled by attenuators 103,106,109 in response to the measured dither amplitudes. The communication between the OAM 112 and the measurement apparatus at each EDFA 113,115,118,120 takes place via the optical services channel (OSC) 117.

Depending on the type of fiber and the wavelength plan used; the value of the peak provisioned power can be set by the systems designer to avoid an unacceptable penalty because of FWM and XPM. Often, this peak power limit is encountered before (at a lower gain value) than the total power limit. It can also happen that some EDFAs in a multi-span link will be under peak power control while some EDFAs will be under total power control.

SUMMARY OF THE INVENTION

The invention may be summarized as a method for optimizing the performance of a fiber optic communication system comprising a plurality of WDM channels extending over a plurality of spans, each of which includes an optical amplifier such as an Erbium Doped Fiber Amplifier (EDFA), between a first terminal and a second terminal. The method, according to the invention, substantially equalizes, over all the WDM channels, a performance indicating factor (PIF), such as bit error rate (BER) or Q, measured at the second terminal, such that at least one of the channels somewhere along its length between the first and second terminals reaches but does not exceed a provisioned optical power level but the remaining channels do not reach the provisioned power level and subsequently increasing transmission powers of at least one of the remaining channels such that at some point along its length at least one of the remaining channels comes close to the provisioned optical power.

Equalization may be accomplished by calculating the new transmission powers of each channel using an equalization algorithm and iteratively adjusting the transmission power of the channel signals as necessary by, for example, adjusting a variable optical attenuator (VOA) at the output of a respective optical transmitter.

Over-equalization by increasing the transmission powers may be accomplished by calculating the new transmission powers of each channel using an over-equalization algorithm and iteratively adjusting the transmission powers of the channel signals as necessary by, for example, adjusting a VOA at the output of a respective optical transmitter.

Advantageously, the invention provides a higher grade of service (lower BER, higher Q) on the remaining channels which have their powers increased. Furthermore, the average grade of service over all of the channels is increased. Furthermore, the communication system lifetime is increased with the average grade of service over all of the channels. Alternatively, the same average grade of service can be maintained over an increased span loss.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE INVENTION

Figure 1:
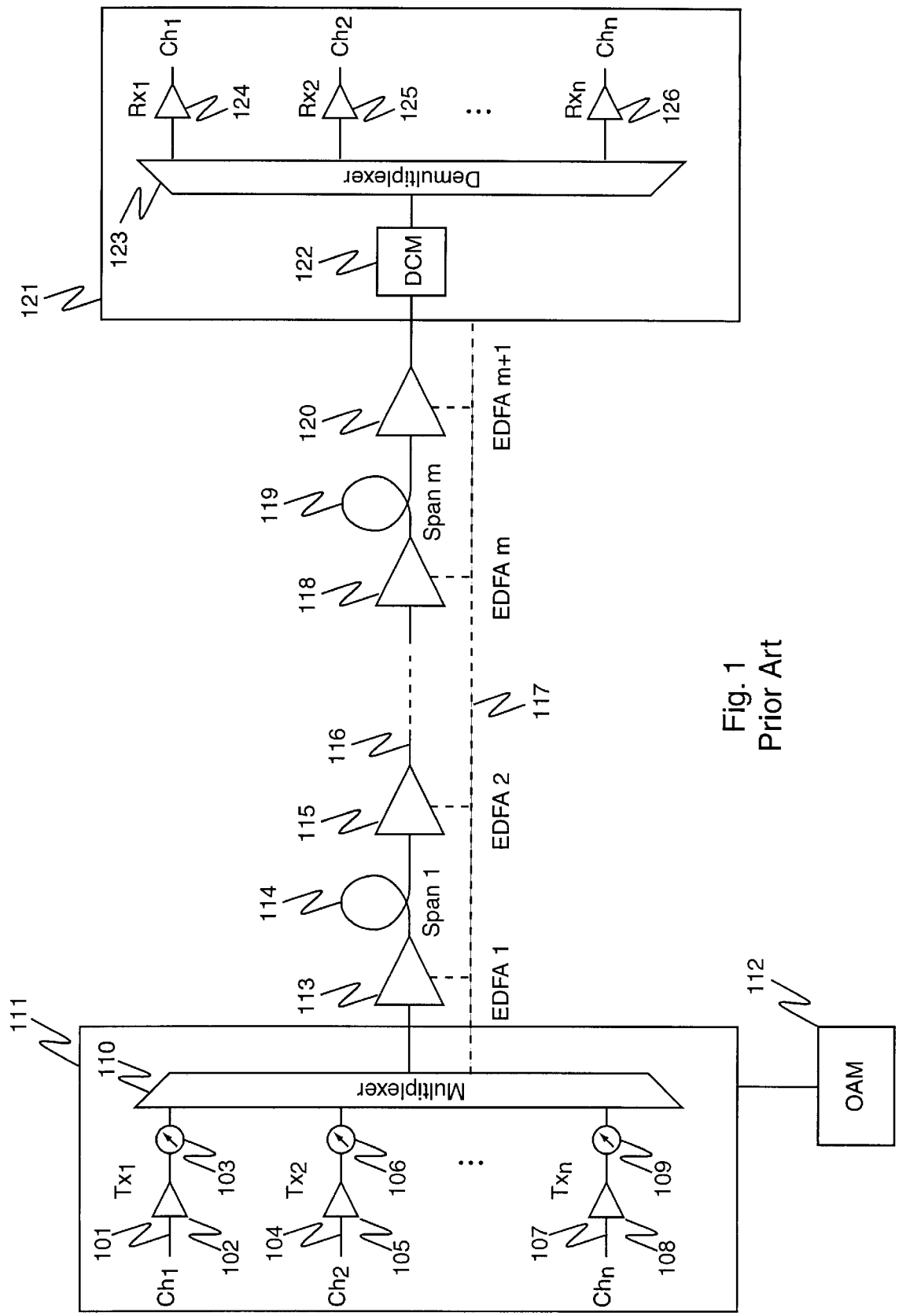
FIG. 1 is a block diagram of a WDM fiber optic communication system.

Although a preferred embodiment of the present invention is described in detail herein below for a specific optical fiber communication system, it should be understood that the scope of the present invention is not meant to be limited to such an embodiment. In particular, despite the present invention being conceived of to compensate for problems with EDFA amplifiers, it should be understood that the present invention could be used with other types of amplifiers that have similar characteristics.

It will be shown here that end performance equalization as described herein above is not the optimum approach when the peak power control (PPC) mode of operation dominates, as it often does for WDM systems. The optimum approach is to equalize all of channels according to the standard methods of equalization and then over-equalize the channels that are below the PPC limit. Consider for example, the extreme case in which all of the EDFAs are well into PPC mode, but we initially use the same equalization scheme as described herein above. Here, the peak power limit is encountered at EDFA gains well below those values that would provoke the TPC limit. If there are m spans of fiber, then there are m+1 EDFAs in the system, and they will be considered to all have the same PPC power limit, say 5 dBm, for the purposes of illustration. For each of the m+1 EDFAs, the gain will rise until the PPC power will be encountered with one of the channels. Because of EDFA gain tilt, there will be a tendency for one channel to be the controlling channel for the upstream EDFAs and another channel to be the controlling channel for the downstream EDFAs. The lowest gain channel will tend to be the one controlling the upstream EDFAs since end performance equalization would say that this lowest gain channel should have its transmitter power at the highest setting. The highest gain channel will then be the one taking control of the downstream EDFAs. Table 1 shows one example of this situation after standard equalization, for the case of a simple wavelength plan of 10 (n=10) wavelengths in a spectral band over 6 (m=6) spans of fiber. The span loss is 22.5 dB/span which is above the DFG of 20 dB. This difference accounts for the spectral behavior of Table 1. In high capacity WDM systems, there are typically many more wavelength channels than there are fiber spans.

TABLE 1

| Channel Number | VOA Atten. [dB] | Post Amp Power [dBm] | | | | | | | System Q |
|---|---|---|---|---|---|---|---|---|---|
| | | EDFA 1 | EDFA 2 | EDFA 3 | EDFA 4 | EDFA 5 | EDFA 6 | EDFA 7 | |
| 1 | 3.0680 | −3.1427 | 2.3733 | 5.0000 | 5.0000 | 5.0000 | 5.0000 | 5.0000 | 7.0347 |
| 2 | 2.6740 | −0.8079 | 2.5985 | 3.8761 | 3.2182 | 2.5602 | 1.9023 | 1.2444 | 7.0353 |
| 3 | 2.1640 | 0.6077 | 3.0298 | 3.6777 | 2.7128 | 1.7479 | 0.7829 | −0.1820 | 7.0353 |
| 4 | 2.0580 | 0.8785 | 3.1214 | 3.6548 | 2.6340 | 1.6132 | 0.5924 | −0.4284 | 7.0348 |
| 5 | 1.9300 | 1.1806 | 3.2343 | 3.6467 | 2.5669 | 1.4871 | 0.4073 | −0.6725 | 7.0351 |

TABLE 1-continued

| Channel Number | VOA Atten. [dB] | Post Amp Power [dBm] | | | | | | | System Q |
|---|---|---|---|---|---|---|---|---|---|
| | | EDFA 1 | EDFA 2 | EDFA 3 | EDFA 4 | EDFA 5 | EDFA 6 | EDFA 7 | |
| 6 | 1.7350 | 1.6173 | 3.4083 | 3.6526 | 2.4909 | 1.3292 | 0.1674 | −0.9943 | 7.0351 |
| 7 | 1.4940 | 2.1323 | 3.6255 | 3.6793 | 2.4247 | 1.1701 | −0.0846 | −1.3392 | 7.0350 |
| 8 | 1.2190 | 2.6959 | 3.8754 | 3.7286 | 2.3761 | 1.0236 | −0.3288 | −1.6813 | 7.0351 |
| 9 | 0.6510 | 3.7975 | 4.3970 | 3.8793 | 2.3460 | 0.8126 | −0.7207 | −2.2541 | 7.0349 |
| 10 | 0.0000 | 5.0000 | 5.0000 | 4.0989 | 2.3786 | 0.6583 | −1.0620 | −2.7823 | 7.0347 |

Figure 5:
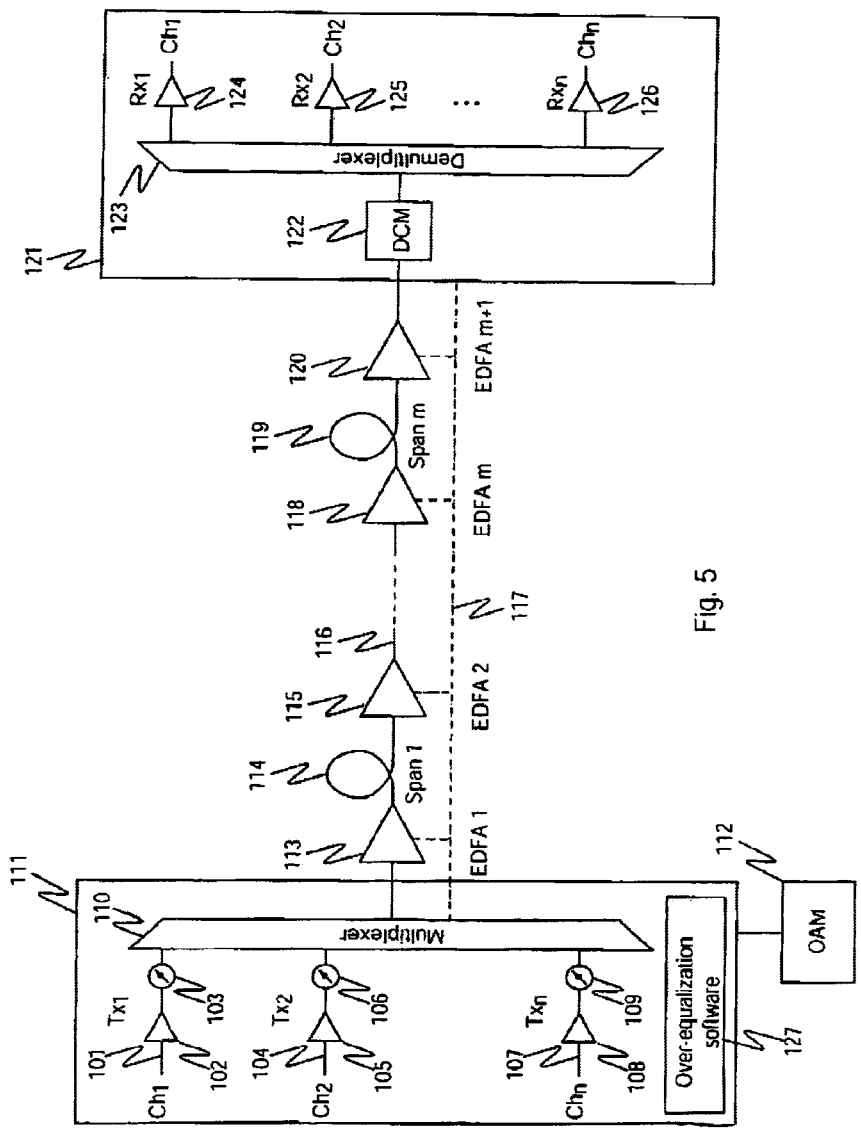
FIG. 5 is a block diagram of a WDM fiber optic communication system in accordance with an embodiment of the invention.

Referring to FIG. 5, channel power information from all of the EDFAs 113,115,118,120 is passed along the OSC 117 to a single collection point where the over-equalization software 127 resides in memory on a circuit card. This collection point is most conveniently at the transmitter terminal 111 end, in close proximity to the VOAs 103,106, 109 of FIG. 1, which is where the power adjustments recommended by the over-equalization software will be made. For new systems, the software 127 would be supplied in a non-volatile fashion (i.e. Read-Only Memory) already resident on the card. It should be noted that similar reference numerals are used to indicate similar elements throughout the figures.

For each of the 7 EDFAs in Table 1, the over-equalization software 127 will increase the EDFA pump power so as to increase the gain until the peak provisioned power of the final stage in the EDFA (post-amp) will be encountered with one of the channels present at that EDFA.

Figure 3A:
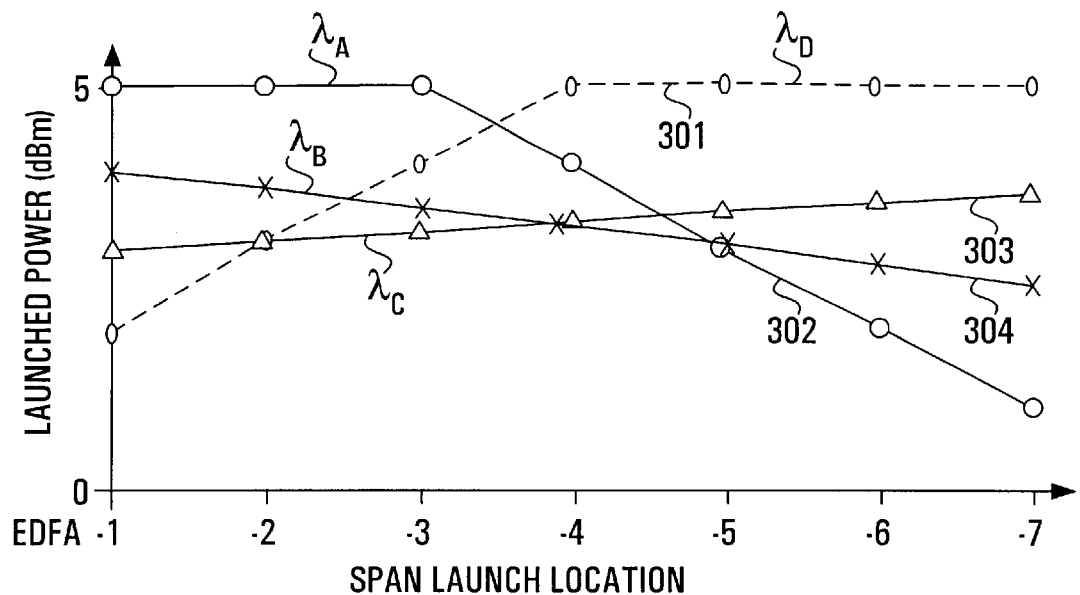
FIG. 3 is a graph of span power profiles.

FIG. 3a is a schematic representation of the span power profile of four wavelength channels in a multi-span WDM link after standard equalization. Shown are the highest gain channel 301 of the entire multi-channel bank, the lowest gain channel 302 and two other channels 303,304 whose gains are slightly above average and slightly below average. It can be seen from the FIG. 3a that at any one span location, only one channel is at the 5 dBm peak provisioned power. As well, the gain on all of the EDFAs has risen until all of the EDFAs are hitting the provisioned power on one of the channels at each EDFA. It can be seen that the lowest gain channel 302 controls the gain for the first 3 most upstream EDFAs, and the highest gain channel 301 controls the gain for the last 4 most downstream EDFAs. The two channels 303,304 shown on the plot which have intermediate amounts of gain do not hit the provisioned power limit at any span.

Figure 2:
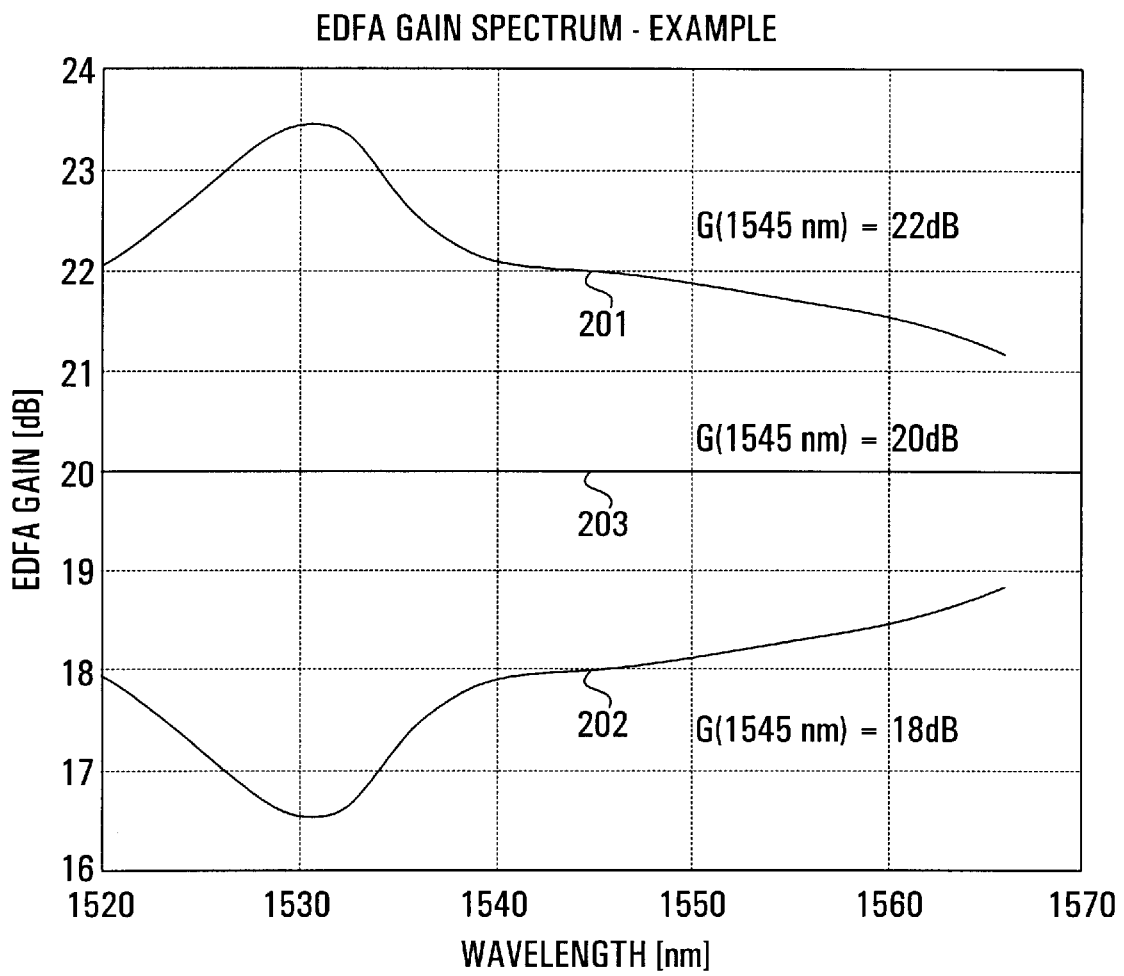
FIG. 2 is a graph of EDFA gain, gain-flattening filter gain and design flat gain versus wavelength.

The numerical example in Table 1 shows the situation after standard Q-equalization has been applied. These values were calculated for the artificial case of having zero residual ripple at the design flat gain (DFG), as shown in FIG. 2. The DGF of the EDFAs in this table is 20 dB. The 10 wavelengths were at 4 nm spacing, ranging from 1532 nm to 1568 nm inclusive. The labels of the EDFA columns of Table 1 correspond to the EDFA positions in FIG. 5. It can be seen from Table 1 that channel #1 (with highest gain) starts out with low launched power coming out of EDFA #1, but then rapidly rises in power going downstream. It hits the peak provisioned power (5 dBm) and controls the gain for EDFA #3 and all of the color EDFAs farther downstream. However, channel #10 with the lowest gain is launched at the highest possible power (the peak provisioned value) out of EDFA #1. It is at the provisioned power and so controls the gain for the first two EDFAs, while for the more downstream EDFAs, the controlling channel changes to channel #1. It can also be seen from Table 1 that none of the other channels (2–9) hit the 5 dBm provisioned power at any of the EDFAs. The final column of Table 1 shows the overall system Q for that channel, including distortion effects and receiver noise as well. It can be seen that this is indeed an equalized system, at a Q of about 7 and therefore, a BER of about $10^{-12}$.

In high capacity WDM systems, there are typically many more wavelength channels than there are EDFA spans. In Table 1, only two channels touch the peak provisioned power at any of the amplifiers. All of the other channels are below the peak provisioned power at all of the other amplifiers. Keeping in mind this case which is well away from the total power limit, there is then no drawback to slightly increasing the launched power at EDFA #1 on these non-controlling channels. In fact, their launched power can be turned up until the first instance where their channel powers first just touch the peak provisioned limit at any of the EDFAs. Since the system is well away from a total power limit, there is no drawback (as there was before) such that the weak channel will be influenced by this adjustment. The advantage of doing this is that the OSNR of each of these non-controlling channels is improved since there is more input power to each of the EDFAs. As well, there is more optical power delivered to the receiver, and it will help to better overcome the receiver noise.

Figure 3B:
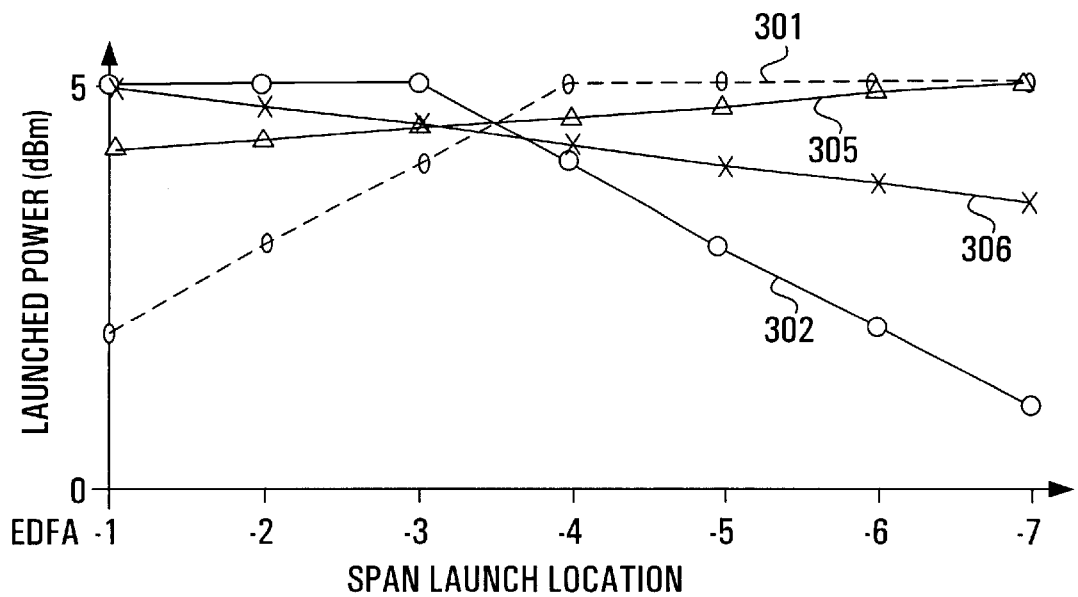

FIG. 3b shows schematically the results of this over-equalization adjustment. The channels having the extreme gain (highest 301 and lowest 302) are unaffected, since they were touching 5 dBm somewhere to start with. However, the EDFA #1 launched power on all of the non-extreme channels 305,306 is increased. This increase continues until each channel hits 5 dBm at one of the EDFAs. Table 2 shows the effects of applying this adjustment to the situation portrayed in Table 1. It can be seen that all of the channels are now just touching 5 dBm at one or more of the EDFAs. By looking at the final column, the Q values for the extreme channels (1 and 10) are the same as in Table 1, since those two channels did not experience the over-equalization. However, the Q values for all of the other channels are higher than the corresponding values in Table 1, and so they are higher than those of the extreme gain channels. This higher Q over most of Table 2 means that all except 2 of the channels in the system can actually deliver a higher BER grade of service after over-equalization than could be obtained with simple equalization. In fact, the highest Q channels after over-equalization are capable of delivering a BER near $10^{-15}$. This procedure is captured in detail in the flowchart algorithm supplied.

TABLE 2

| Channel Number | VOA Atten. [dB] | Post Amp Power [dBm] | | | | | | | System Q |
|---|---|---|---|---|---|---|---|---|---|
| | | EDFA 1 | EDFA 2 | EDFA 3 | EDFA 4 | EDFA 5 | EDFA 6 | EDFA 7 | |
| 1 | 3.0680 | −3.1427 | 2.3733 | 4.9994 | 5.0000 | 5.0000 | 5.0000 | 5.0000 | 7.0347 |
| 2 | 1.5510 | 0.3151 | 3.7215 | 4.9986 | 4.3412 | 3.6832 | 3.0253 | 2.3674 | 8.1423 |
| 3 | 0.8420 | 1.9297 | 4.3518 | 4.9993 | 4.0348 | 3.0699 | 2.1049 | 1.1400 | 8.3621 |
| 4 | 0.7130 | 2.2235 | 4.4664 | 4.9994 | 3.9790 | 2.9582 | 1.9374 | 0.9166 | 8.3884 |
| 5 | 0.5770 | 2.5336 | 4.5873 | 4.9993 | 3.9199 | 2.8401 | 1.7603 | 0.6805 | 8.3998 |
| 6 | 0.3880 | 2.9643 | 4.7553 | 4.9993 | 3.8379 | 2.6762 | 1.5144 | 0.3527 | 8.3965 |
| 7 | 0.1730 | 3.4533 | 4.9465 | 5.0000 | 3.7457 | 2.4911 | 1.2364 | −0.0182 | 8.3721 |
| 8 | 0.0950 | 3.8199 | 4.9994 | 4.8523 | 3.5001 | 2.1476 | 0.7952 | −0.5573 | 8.1633 |
| 9 | 0.0480 | 4.4005 | 5.0000 | 4.4820 | 2.9490 | 1.4156 | −0.1177 | −1.6511 | 7.6256 |
| 10 | 0.0000 | 5.0000 | 5.0000 | 4.0987 | 2.3786 | 0.6583 | −1.0620 | −2.7823 | 7.0347 |

Figure 4:
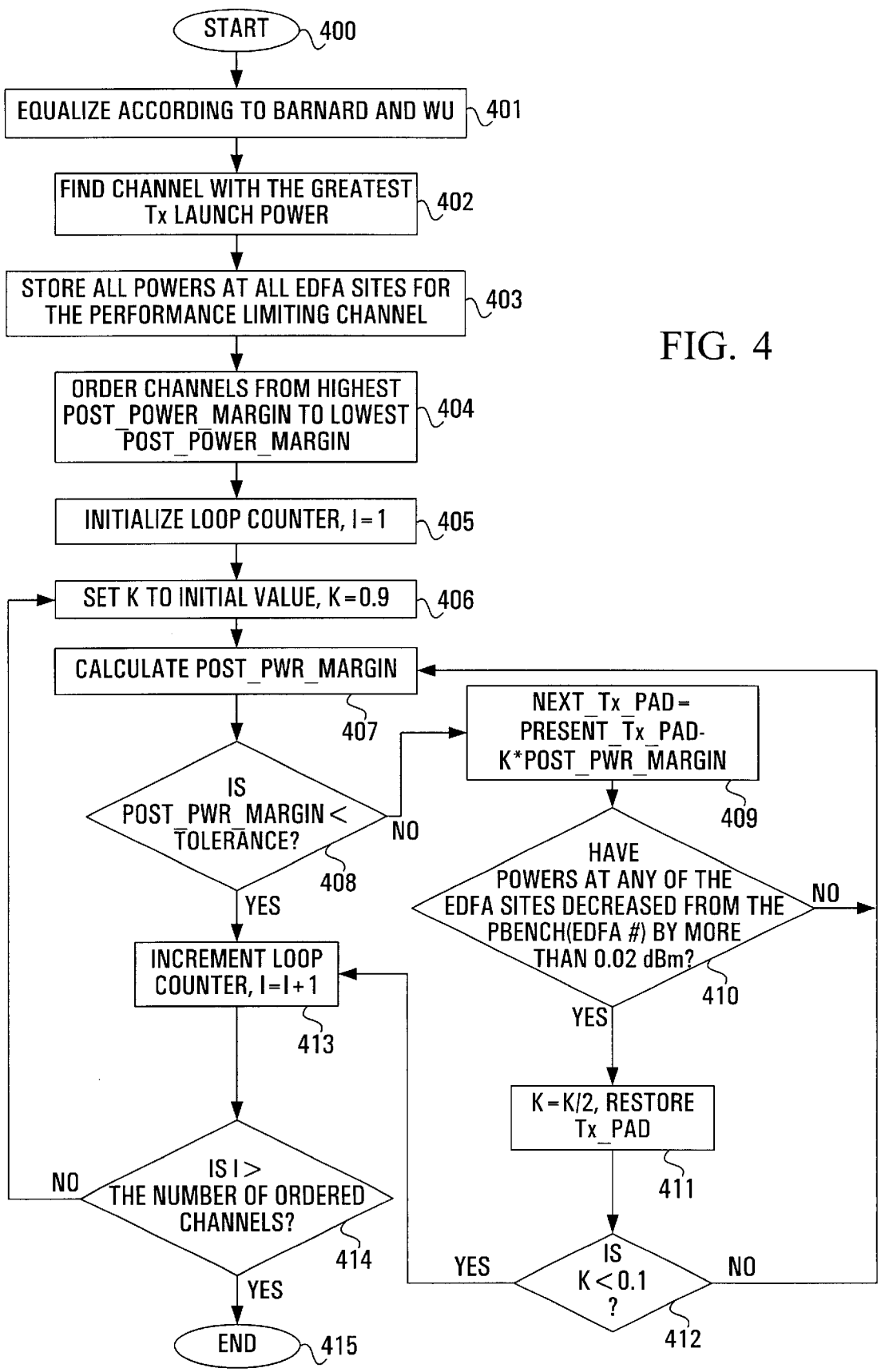
FIG. 4 is a flow chart showing the execution of the over-equalization process of the invention.

The over-equalization algorithm will now be described with reference to FIG. 4. The over-equalization algorithm is initiated 400, by initiating a computer program running on a processing element located on a circuit card in the transmitter terminal 111.

Step 1, box 401. Equalize a performance indicating factor such as bit error rate, measured at the receiving terminal, using the methods described in the above-mentioned U.S. patent application Ser. No. 08/997,822.

Step 2A, box 402. Store in memory the number of performance-determining channel. That is, the wavelength or channel with the greatest Tx launch power setting (minimum VOA setting).

Step 2B, box 403. Store in memory, as a benchmark, the powers at all EDFA sites for this performance limiting channel (Pbench (EDFA #1). The amplifier output power values are known for every wavelength and every EDFA site by using, for example, an analog maintenance signal to determine the power at each wavelength. Reference should be made to above-mentioned U.S. Pat. No. 5,513,029 for further details on the use of an analog maintenance signal for this purpose.

Step 3, box 404. For each channel, calculate post_pwr_margin=minimum of difference between the operating post amp power at every EDFA and that from the provisioned limit at every EDFA. Order the channels according to desired equalization strategy: For example, order the channels starting from highest post_pwr_margin to lowest power post_pwr_margin. This would allow over-equalization to achieve the greatest improvement in BER for a single channel if a total power limit is reached. If a total power limit does not occur, the ordering is not a factor.

Step 4, box 405. Loop to perform over-equalization for the ordered channels, one channel at a time. Initialize loop counter, I=1.

Step 4A, box 406. Set K scale factor to initial value (for example, K=0.9).

Step 4B. Iterate the following steps (4B i. to 4B v.) until the K factor becomes smaller than desired limit (for example, K<0.1).

Step 4B i, box 407. For the channel under investigation, calculate post_pwr_margin=minimum of difference between the operating post amp power at every EDFA and that from the provisioned limit at every EDFA.

Step 4B ii, box 408. Is post_pwr_margin less than the specified tolerance (for example, 0.01 dB)? If it is within the tolerance, then move on to the next channel (Go to step 5, box 413). If it is not within tolerance continue to step 4B iii.

Step 4B iii, box 409. Increase the Tx power of the current channel (reduce Tx_Pad, Tx_Pad is the attenuation setting of the VOA) according to the relation:

next_Tx_Pad=present_Tx_Pad−K*post_pwr_margin

Step 4B iv, box 410. For the incremented Tx power, check to ensure that the powers at any of the EDFA sites have not decreased from the Pbench(EDFA #) values for the performance limiting channel by more than a certain tolerable small amount, for example 0.02 dBm.

Step 4B v a, box 411. If yes, the power at any EDFA site has decreased by more than this certain small amount, then a total power limit has been encountered, so restore the most recent Tx power (keep the present Tx_Pad value and discard the next_Tx_Pad result) and reduce the size of the K scale factor, for example, half of the present value. This allows the maximum use of the total power available. Test if k<0.1, box 412. If yes then go to step 5 at 413, else go to Step 4B i at 407.

Step 4B v b. If no, use the new power settings and return to step 4B i. for a further iteration on the same channel.

Step 5, box 413,414. Increment loop counter, I=I+1 413. Test loop counter 414. If loop counter is less than or equal to the number of ordered channels continue to the next channel in the sequence (return to step 4). If loop counter is greater than the number of ordered channels, end 415.

Although the originally controlling channels in the system are not hurt by this over-equalization, neither directly do they benefit. The advantage comes about in that the end performance (defined by BER) will improve for all except the original two controlling channels (Channel #1, Channel #10). In one application, this higher BER grade of service on most of the channels could be sold separately, for a premium. Alternatively, it could be said that the original grade of service could be maintained over a longer average system lifetime, if we consider the average lifetime over all of the channels, even thought the lifetime of the original two channels is unchanged. As another means of application, the same grade of service (averaged over all channels) could be maintained for the same system lifetime, but with an increase in allowed span loss.

The embodiments described above may be modified without departing from the principles of the invention. For, example, the invention may be applied to bidirectional fiber optic transmission systems in which optical signals are propagated in opposite directions on a common fiber.

What has been described is merely illustrative of the application of the principles of the invention. Other arrangements and methods can be implemented by those skilled in the art without departing from the spirit and scope of the present invention.

What is claimed is:

1. A method for optimizing the performance of a fiber optic communication system comprising a plurality of WDM channels extending over a plurality of spans, each of which includes an optical amplifier, between a first terminal and a second terminal, the method comprising:

substantially equalizing over all the WDM channels a performance indicating factor (PIF) measured at the second terminal such that at least one of the channels somewhere along its length between the first and second terminals reaches but does not exceed a provisioned optical power level but the remaining channels do not reach the provisioned optical power level; and subsequently increasing transmission power of at least one of the remaining channels such that at some point along its length at least one of the remaining channels comes close to the provisioned optical power level.

2. The method of claim 1, wherein the optical amplifier is an Erbium Doped Fiber Amplifier (EDFA).

3. The method of claim 1, wherein the PIF is bit error rate (BER).

4. The method of claim 1, wherein the PIF is Q.

5. The method of claim 1, wherein the PIF is optical signal to noise ratio (OSNR).

6. The method of claim 1, wherein equalizing is accomplished by calculating the new transmission powers of each channel using an equalization algorithm and iteratively adjusting the transmission power of the channel signals as necessary.

7. The method of claim 6, wherein adjusting the transmission power of each channel is accomplished by adjusting a variable optical attenuator (VOA) at the output of a respective optical transmitter.

8. The method of claim 1, wherein increasing the transmission powers is accomplished by calculating the new transmission powers of each channel using an over-equalization algorithm and iteratively adjusting the transmission power of the channel signals as necessary.

9. The method of claim 8, wherein adjusting the transmission power of each channel is accomplished by adjusting a VOA at the output of a respective optical transmitter.

10. The method of claim 1, wherein the equalization step causes two of the channels somewhere along their length between the first and second terminals to reach but not exceed the provisioned optical power level.

11. The method of claim 1, wherein the increasing step increases the transmission powers of all of the remaining channels such that at some point along their length all of the remaining channels come close to the provisioned optical power level.

12. The method of claim 1, wherein the increasing step increases the transmission powers of all of the remaining channels such that at some point along their length all of the remaining channels reach to the provisioned optical power level.

13. The method of claim 1, wherein the increasing step increases the transmission powers of at least one of the remaining channels such that a total power limit is not exceeded.

14. Apparatus comprising a plurality of WDM channels extending over a plurality of spans, each of which includes an optical amplifier, between a first terminal and a second terminal, the apparatus comprising:

means for substantially equalizing over all the WDM channels a performance indicating factor (PIF) measured at the second terminal such that at least one of the channels somewhere along its length between the first and second terminals reaches but does not exceed a provisioned optical power level but the remaining channels do not reach the provisioned power level; and means for subsequently increasing transmission powers of at least one of the remaining channels such that at some point along its length at least one of the remaining channels comes close to the provisioned optical power level.

15. The apparatus of claim 14, wherein the optical amplifier is an Erbium Doped Fiber Amplifier (EDFA).

16. The apparatus of claim 14, wherein the PIF is bit error rate (BER).

17. The apparatus of claim 14, wherein the PIF is Q.

18. The apparatus of claim 14, wherein the PIF is optical signal to noise ratio (OSNR).

19. The apparatus of claim 14, wherein the means for equalizing includes means for calculating the new transmission powers of each channel using an equalization algorithm and means for iteratively adjusting the transmission power of the channel signals as necessary.

20. The apparatus of claim 19, wherein the means for adjusting the transmission power of each channel includes means for adjusting a variable optical attenuator (VOA) at the output of a respective optical transmitter.

21. The apparatus of claim 14, wherein the means for increasing the transmission powers includes means calculating the new transmission powers of each channel using an over-equalization algorithm and iteratively adjusting the transmission power of the channel signals as necessary.

22. The apparatus of claim 21, wherein the means for adjusting the transmission power of each channel includes means for adjusting a VOA at the output of a respective optical transmitter.

23. A computer-readable storage medium containing software that, when running on a processing element, follows a sequence of steps to optimize the performance of a fiber optic communication system comprising a plurality of WDM channels extending over a plurality of spans, each of which includes an optical amplifier, between a first terminal an a second terminal, the steps comprising:

substantially equalizing over all the WDM channels a performance indicating factor (PIF) measured at the second terminal such that at least one of the channels somewhere along its length between the first and second terminals reaches but does not exceed a provisioned optical power level but the remaining channels do not reach the provisioned optical power level; and subsequently increasing transmission powers of at least one of the remaining channels such that at some point along its length at least one of the remaining channels comes close to the provisioned optical power level.

24. The computer-readable storage medium of claim 23, wherein the optical amplifier is an Erbium Doped Fiber Amplifier (EDFA).

25. The computer-readable storage medium of claim 23, wherein the PIF is bit error rate (BER).

26. The computer-readable storage medium of claim 23, wherein the PIF is Q.

27. The computer-readable storage medium of claim 23, wherein the PIF is optical signal to noise ratio.

28. The computer-readable storage medium of claim 23, wherein equalizing is accomplished by calculating the new transmission powers of each channel using an equalization algorithm and iteratively adjusting the transmission power of the channel signals as necessary.

29. The computer-readable storage medium of claim 28, wherein adjusting the transmission power of each channel is accomplished by adjusting a variable optical attenuator (VOA) at the output of a respective optical transmitter.

30. The computer-readable storage medium of claim 23, wherein increasing the transmission powers is accomplished by calculating the new transmission powers of each channel using an over-equalization algorithm and iteratively adjusting the transmission power of the channel signals as necessary.

31. The computer-readable storage medium of claim 30, wherein adjusting the transmission power of each channel is accomplished by adjusting a VOA at the output of a respective optical transmission.

* * * * *